United States Patent [19]

Occella et al.

[11] 4,270,498
[45] Jun. 2, 1981

[54] INTERNAL COMBUSTION ENGINE

[75] Inventors: Sergio Occella; Giulio Arietti; Giampiero Borello, all of Turin, Italy

[73] Assignee: Centro Ricerche Fiat S.p.A., Turin, Italy

[21] Appl. No.: 30,807

[22] Filed: Apr. 17, 1979

[30] Foreign Application Priority Data

Apr. 18, 1978 [IT] Italy ............................. 67872 A/78
Mar. 26, 1979 [IT] Italy ............................. 67615 A/79

[51] Int. Cl.³ ........................................... F02B 19/10
[52] U.S. Cl. .................................... 123/276; 123/280
[58] Field of Search ............... 123/32 SP, 32 F, 32 B, 123/193 P, 32 ST, 191 S, 191 SP, 33 R, 33 D

[56] References Cited

U.S. PATENT DOCUMENTS

| 1,378,176 | 5/1921 | Norris | 123/32 B |
| 2,061,826 | 11/1936 | Bremser | 123/32 SP |
| 2,169,381 | 8/1939 | Chapman | 123/32 B |
| 2,254,438 | 9/1941 | McCarthny | 123/191 SP |
| 2,483,288 | 9/1949 | Malin | 123/32 B |
| 3,092,087 | 6/1963 | Holt et al. | 123/32 B |
| 4,019,473 | 4/1977 | Kamiya | 123/32 ST |

Primary Examiner—Charles J. Myhre
Assistant Examiner—Raymond A. Nelli
Attorney, Agent, or Firm—Sughrue, Rothwell, Mion, Zinn & Macpeak

[57] ABSTRACT

An internal combustion engine has a fuel injector located in a side wall of each cylinder, and a combustion chamber in each cylinder formed largely by a cavity recessed in the crown of the piston, to define substantial "squish" areas between the piston crown and a cylinder head which contains an ignition prechamber, situated opposite the fuel injector, communicating with a sparking plug, the fuel injector being arranged to direct at least one part of the fuel into a region adjacent the ignition prechamber which forms part of the volume of the combustion chamber.

13 Claims, 20 Drawing Figures

INTERNAL COMBUSTION ENGINE

The present invention relates to internal combustion engines with powered ignition and petrol injection into each cylinder, of the type in which the greater part of the combustion chamber in each cylinder is recessed into the piston in the cylinder.

More particularly, the invention relates to engines of the type specified above with stratified charge, that is, engines in which the combustible mixture in each combustion chamber is inhomogeneous, having a proportion of fuel which varies from point to point in the combustion chamber, being richer in the region of the combustion chamber situated in proximity of the ignition plug.

Such known engines with stratified charge exhibit a reduction of fuel consumption at low engine loads, that is, at low values of engine output torque, and also a reduction of atmospheric pollution, due to control of the amount of carbon monoxide and nitrogen oxide in the engine exhaust gases at low and medium loads of the engine.

Such engines also afford the possibility of using fuel with reduced anti-knock rating, and are therefore more economical and less polluting, since inhomogeneous combustible mixture has a low overall fuel content and is therefore less likely to give rise to self-ignition.

Engines with stratified charge according to the prior art have, however, the disadvantages that the specific power obtainable is rather limited and the fuel consumption and exhaust emissions of carbon monoxide at full engine load are considerable.

The mechanism of the formation of the charge in the engine combustion chambers, which has been studied for the purpose of allowing, at low engine loads, a concentration of fuel in the region of the sparking plug such as to ensure ignition of the combustible mixture with very lean overall mixture strength, is not sufficiently controllable and causes excessive enrichment of the mixture at full engine loads. Furthermore, the need to establish, and to maintain up to the moment of ignition, the charge stratification makes it difficult to effect rapid mixing between the combustion products in the fuel-rich region of the combustion chamber and the remaining leaner mixture. Given that, as known, complete mixing occurs with the excess oxygen present in the remaining leaner fraction of the charge, if such mixing does not occur sufficiently rapidly and completely the formation of carbon monoxide results and the development of the combustion occurs over an excessively long period. The rapidity of such mixing is furthermore necessary to allow complete advantage to be taken of the action of the combustion products of the rich fraction of the charge which should, according to the latest studies, make the combustion of the leaner fraction of the mixture more rapid by virtue of their high reactivity.

The main object of the present invention is the provision of an internal combustion engine with powdered ignition and petrol injection into each cylinder without the disadvantages referred to above, which allows control of the degree of stratification as a function of the operating regime and the operating load of the engine.

With a view to achieving this object, the invention provides an internal combustion engine with powered ignition and fuel injection into each cylinder, of the type in which the combustion chamber in each cylinder is largely formed by a cavity recessed in the crown of the associated piston, characterised by the following features in combination:

a fuel injector is situated in a side wall of the cylinder in proximity to the cylinder head;

the cavity recessed into the piston is concentrated in one part of the crown of the piston so as to form areas of "squish" of the combustible mixture between the crown of the piston and the cylinder head;

the cylinder head contains an ignition prechamber situated in the side of the head opposite the fuel injector and with which the electrodes of a sparking plug communicate, and the fuel injector is so shaped and orientated so as to direct at least one part of the fuel into a region adjacent to the ignition prechamber and forming of the volume of the combustion chamber.

In a preferred embodiment of the invention, the axis of the fuel injector and the geometrical centre of the ignition prechamber lie substantially in a common plane about which the piston cavity is symmetrical, said plane being a diametral plane of the cylinder, preferably the one orthogonal to the axis of the crankshaft of the engine.

The invention will be further described, by way of example, with reference to the accompanying drawings, in which.

Figure 1:
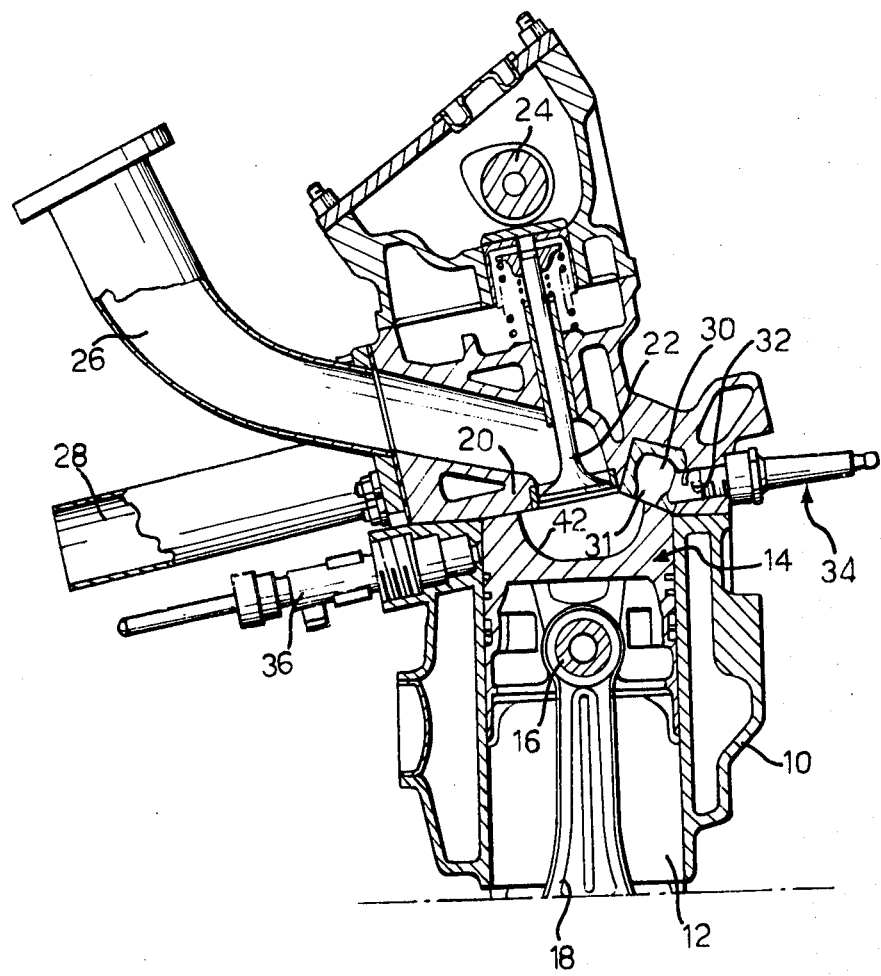
FIG. 1 is a transverse vertical sectional view, partically broken-away, of an internal combustion engine according to one embodiment of the invention.
Figure 2:
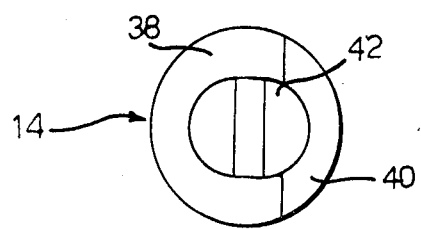
FIG. 2 is a plan view of a piston of the engine illustrated in FIG. 1.

With reference to FIGS. 1 and 2, reference numeral 12 indicates a cylinder of an internal combustion Otto cycle engine. Inside the cylinder 12 a piston 14 is slidable with a fluid-tight seal. A connecting rod 19 is pivotally connected to the underside of the piston 14 through a gudgeon pin 16. The top of the cylinder 12 is closed by a head 20 in which, for each cylinder, there is mounted an inlet valve 22 and an exhaust valve (not illustrated). The inlet valve 22 and the exhaust valve are controlled by a common cam shaft 24 so as to allow respectively the admission of air into the cylinder 12 through an induction conduit 26 and the exhaustion of combustion gases from the cylinder 12 through an exhaust conduit 28.

An ignition prechamber 30 is contained within the cylinder head 20 in proximity to a part of the upper edge of the cylinder 12. The prechamber 30 communicates at its lower end through a passage 31 with the interior of the cylinder 12. The electrodes 32 of a sparking plug 34, disposed substantially horizontally, face towards the ignition prechamber 30 and are in communication therewith.

A fuel injector 36 is located in a side wall of the cylinder 12 in proximity to the head 20 and is connected to a fuel injection pump (not shown). The position of the injector 36 relative to the prechamber 30 is such that the longitudinal axis of the injector 36 and the geometrical centre of the prechamber 30 lie in a common diametral plan of the cylinder 12, preferably the diametral plane which is orthogonal to the axis of the crankshaft of the engine. The injector 36 is of the type with single atomizer of variable section incorporating, for example, a spring-loaded poppet valve or needle valve, the injector 36 being orientated so as to direct the entire fuel jet into the region of the cylinder 12 corresponding to the mouth 31 of the prechamber 30.

As shown in plan in FIG. 2, the crown of the piston 14 is shaped like a roof formed by a part 38 and a part 40 with inclinations to the axis of the cylinder identical to the inclinations of the corresponding facing surfaces of the head 20. A cavity 42 is provided in the crown of the piston 14 and forms the combustion chamber of the cylinder 12. The cavity 42 is confined to a part of the crown of the piston 14 so as to give rise to large areas of squashing of the combustible mixture, so-called "squish" area, between the crown of the piston 14 and the head 20 of the cylinder 12. The cavity 42 is symmetrical with respect to the geometrical plane containing the axis of the injector 36 and the geometrical centre of the prechamber 30 and has an elongate shape along the axis of the fuel jet delivered by the injector 36.

In operation of this engine, the injection of fuel is effected during the compression stroke of the piston 14. The fuel is injected towards a region of the cylinder 12 which is adjacent the prechamber 30 and which, when the piston 14 is in the top dead centre position, forms part of the volume of the combustion chamber.

The degree of stratification of the charge, that is, the enrichment of the mixture in the prechamber 30, can either be regulated in the construction of the engine by variation of the inclination of the axis of the injector 36 to the horizontal plane in the construction of the engine, or by modifying the effective nozzle area of the fuel jet of the injector 36, or during the operation of the engine by varying the timing of the injection.

The degree of charge stratification is controlled automatically in dependence upon the engine load, since at minimum and low loads the fuel injection takes place about the bottom dead centre (b.d.c.) position into the upper mass of the charge, a mass which is subsequently forced by the piston 14 into the prechamber 30.

The presence of the prechamber 30 facilitates the rapid preparation of ignitable mixture in the vicinity of the sparking plug 34, owing to the high temperature at which the prechamber 30 is maintained, and to the turbulence inside the prechamber 30.

During the combustion of the mixture, ignition first takes place in the prechamber 30, where the mixture is relatively rich, and spreads rapidly into the main combustion chamber 40 due to the rapid mixing of the combustion products in the region with the rich mixture with the remaining relatively lean mixture due to the "squish" areas between the crown of the piston 14 and the cylinder head 20.

The variants illustrated in FIGS. 3 to 11 are generally similar to the embodiment illustrated in FIGS. 1 and 2, and only the differences will be described in detail, using the same reference numbers for the same or corresponding parts.

Figure 3:
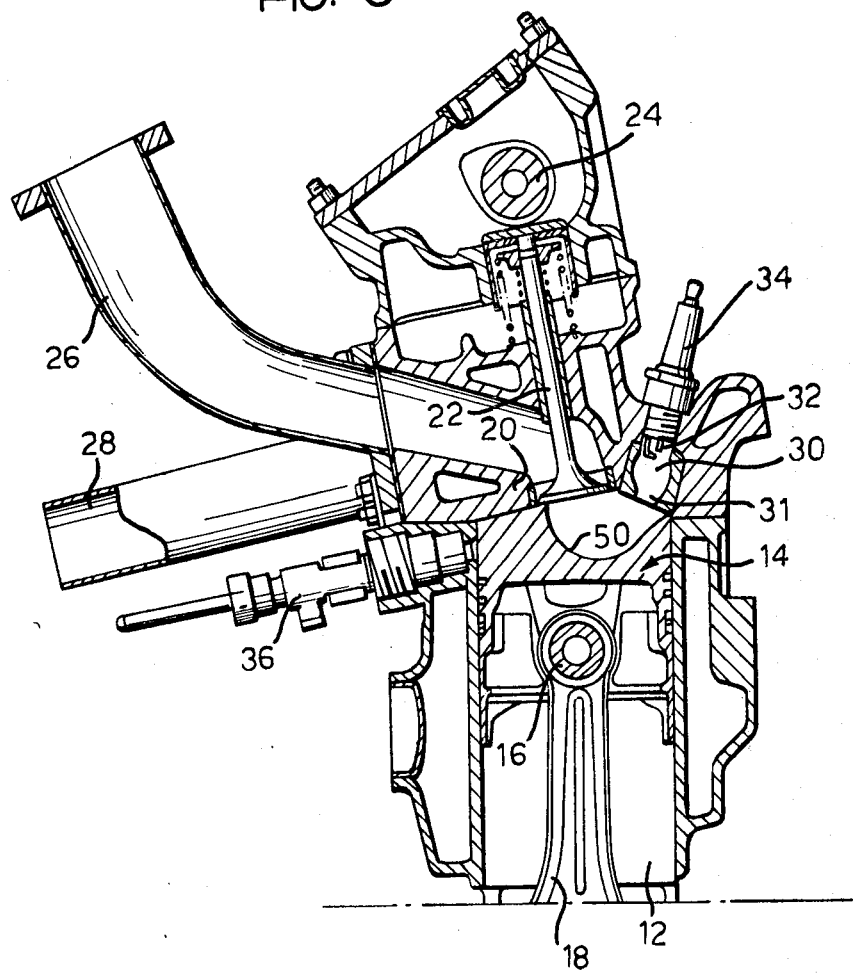
FIG. 3 is a first variant of FIG. 1.
Figure 4:
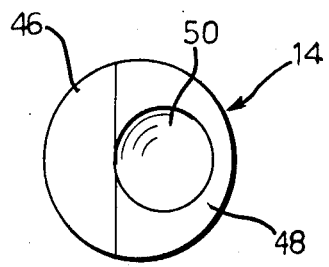
FIG. 4 is a plan view of a piston of the engine illustrated in FIG. 3.

In the variant illustrated in FIGS. 3 and 4, the axis of the sparking plug 34 is directed almost vertically.

The roof-shaped crown of the piston 14 presents a portion 46, facing towards the injector 36, having an inclination to the axis of the cylinder identical to the inclination of the facing surface of the cylinder head 20. The remaining portion 48 of the crown of the piston 14 also has an inclination corresponding to the inclination of the corresponding surface of the cylinder head 20. A cavity 50 in the crown of the piston 14 forms the greater part of the volume of the combustion chamber of the cylinder 12. The cavity 50 has a substantially hemispherical shape and is recessed into the piston 48 of the crown of the piston 14, being therefore displaced towards the prechamber 30.

In the variant of FIGS 3 and 4, the degree of charge stratification and of enrichment of the mixture in the prechamber is controlled as in the embodiment of FIGS. 1 and 2. During combustion the mixing of the combustion products coming out of the prechamber 30 and the remaining relatively lean mixture is effected inside the piston cavity 50 and is facilitated by the formation of strong cylindrical vortex movement about a horizontal axis due to the asymmetrical position and to the shape of the cavity 50 and to the "squish" areas between the crown of the piston 14 and the cylinder head, which are particularly extensive in the area opposite the prechamber 30. This vortex movement about a horizontal axis entrains the hotter, and therefore lighter, gases emerging from the prechamber 30 in a centripetal spiral flow which allows a quick combustion of the relatively lean mixture and prevents losses of efficiency and the formation of carbon monoxide from the combustion of the rich mixture in the prechamber 30.

Figure 5:
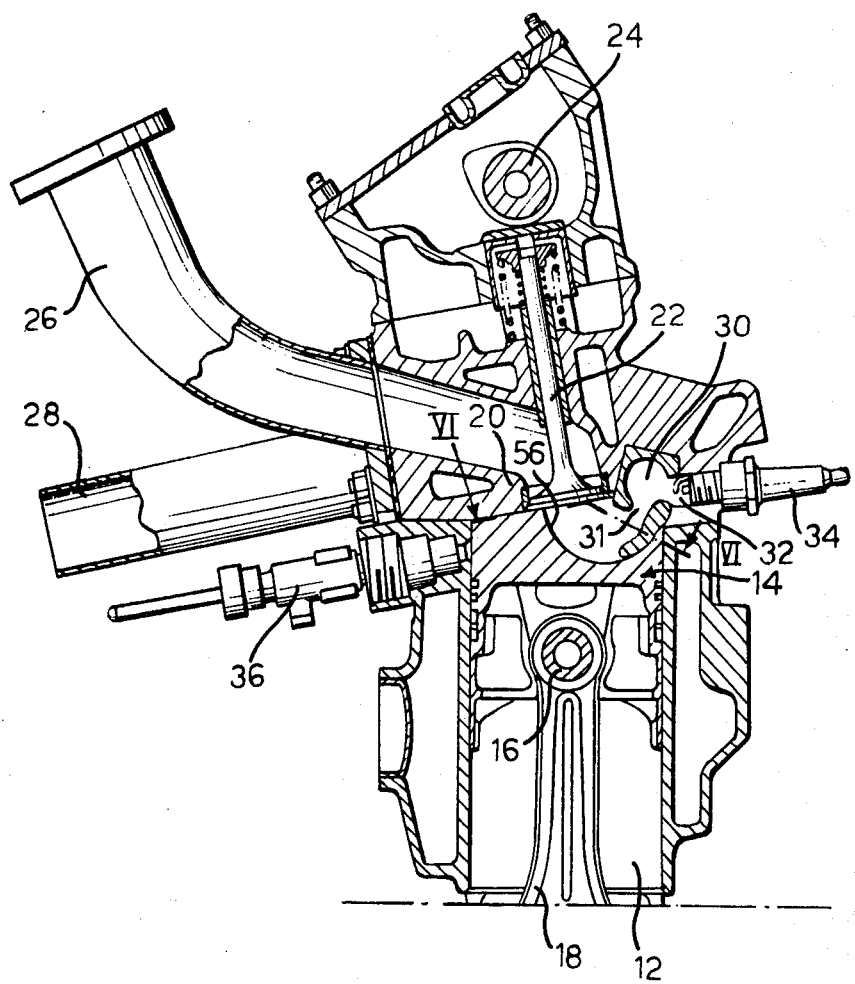
FIG. 5 is a second variant of FIG. 1.
Figure 6:
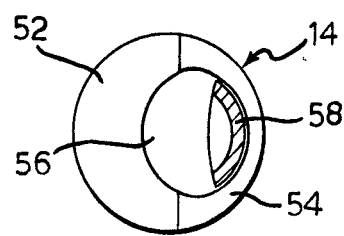
FIG. 6 is a cross section taken on line VI—VI in FIG. 5.

In the variant illustrated in FIGS. 5 and 6, the axis of the sparking plug facing the prechamber 30 is substantially horizontal. The crown of the piston 14 is roof-shaped and has a portion 52 turned towards the injector 36 which has the same inclination to the axis of the cylinder as the corresponding facing surface of the cylinder head 20 and a portion 54 having a smaller surface area than the surface portion 52.

A cavity 56 recessed into the crown of the piston 14 is similar to the cavity 50 illustrated in FIGS. 3 and 4. The prechamber 30 has a baffle 58 with a substantially spherical surface which is superimposed, in the top dead centre position of the piston 14, on the part of the piston cavity 56 facing towards the sparking plug 34.

The fuel injector 36 is orientated in such a way as to direct the jet of fuel against the baffle 58. This avoids the danger of wetting of the portion of the cylinder 12 opposite to the injector 36 and furthermore facilitates the formation of a cylindrical vortex flow of combustible mixture about a horizontal axis, both by virtue of the more compact form of the combustion chamber and by virtue of the "squish" area between the baffle 58 and the cooperating surface of the piston cavity 56.

Because the baffle 58 has a high temperature in operation of the engine, the fuel injected by the injector 36 against said baffle 58 vaporises more rapidly. The baffle 58, moreover ensures a greater enrichment of the combustible mixture in the peripheral region of the combustion chamber since, in this case, the fuel-enriched region of the combustion chamber is formed partly by the prechamber 30 and partly by the peripheral region of the cavity 56.

Similarly to the previous variants illustrated, the combustion of the mixture begins inside the prechamber 30 and spreads rapidly into the piston cavity 56 owing to said cylindrical vortex flow about a horizontal axis which accelerates the mixing of the combustion products of the fuel-rich region with the remaining relatively lean mixture.

In this variant the prechamber 30 may be formed by a recess of small dimensions such as to prevent the wetting of the electrodes 32 of the sparking plug 34 and to limit the speed of the mixture vortex in correspondence with the said electrodes 32.

Figure 7:
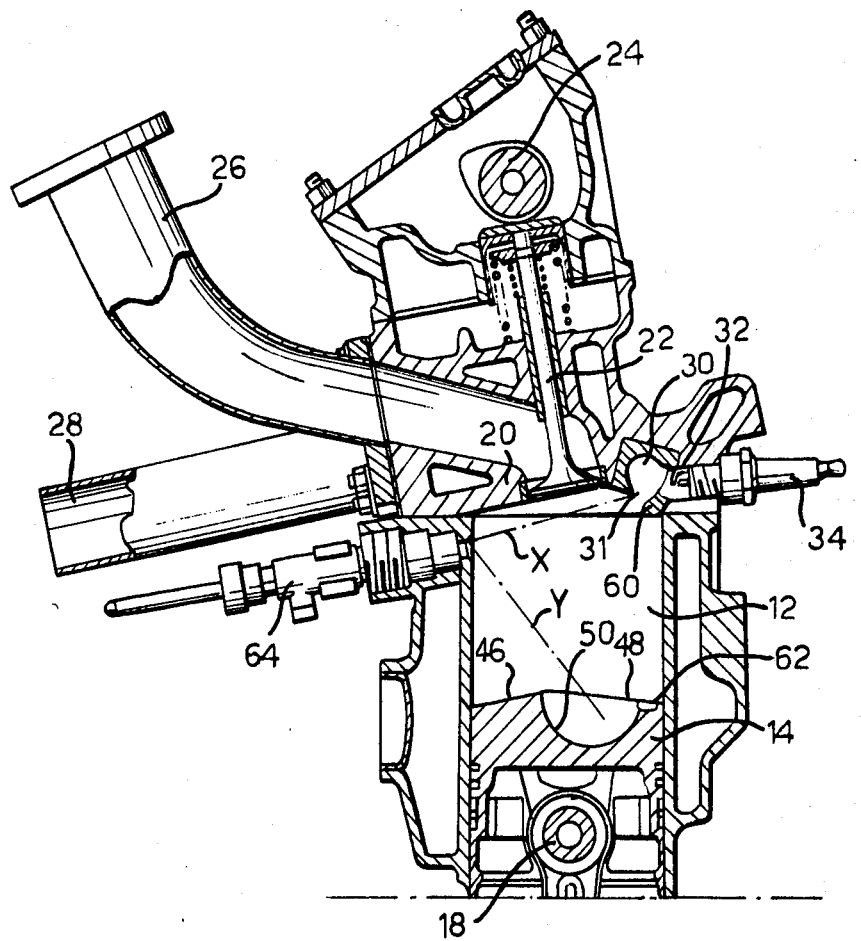
FIG. 7 is a third variant of FIG. 1.
Figure 8:
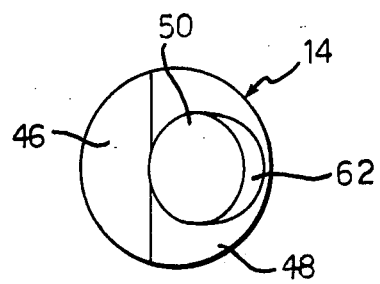
FIG. 8 is a plan view of a piston of the engine illustrated in FIG. 7.

In the variant illustrated in FIGS. 7 and 8 the crown of the piston 14 has a shape similar to that described with reference to FIG. 4. The prechamber 30 has an appendage 60 projecting towards the piston 14 and such as to be superimposed on a cavity 62 recessed into the crown of the piston 14, in the top dead centre position of the latter, in correspondence with the peripheral region of the cavity 50 facing towards the plug 34.

Reference numeral 64 indicates a fuel injector placed in a position similar to the position of the injector 36 in the previous variants. The injector 64 is of the type with multiple atomizer and is orientated so as to direct a jet of fuel X towards the mouth 31 of the prechamber 30 and at least one deflected jet Y downwards towards the cavity 50 of the piston 14. The presence of the appendage 60 facilitates the entry of the jet of fuel X into the prechamber 30.

In this variant the fuel injection takes place when the piston 14 is at a position near its bottom dead centre. In this position of the piston 14 the jet Y of fuel penetrates into the cavity 50 (FIG. 7) and the fuel can readily vaporise.

The use of a multiple atomizer injector 64 for injecting fuel both into the prechamber 30 and the main combustion chamber enables strict control of the degree of charge stratification by controlled choking of the quantity of air inducted as a function of the fuel demand so as to obtain, at low engine loads, a lean overall mixture with an air/fuel ratio in the prechamber 30 of around 14, and, at full engine load, an overall mixture near stoichiometric, with an air/fuel ratio in the prechamber 30 of about 9-10.

Figure 9:
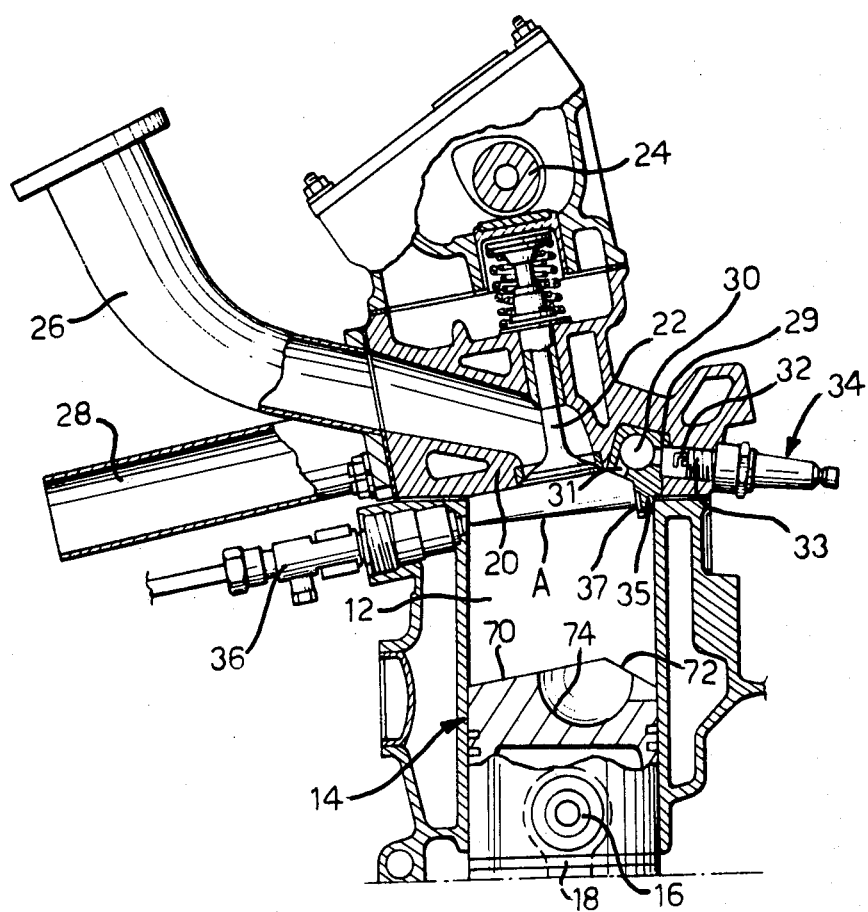
FIG. 9 is a fourth variant of FIG. 1, during the compression stroke of the illustrated piston of the engine.
Figure 10:
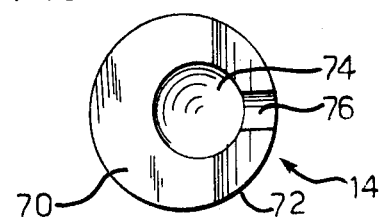
FIG. 10 is a plan view of a piston of the engine illustrated in FIG. 9.
Figure 11:
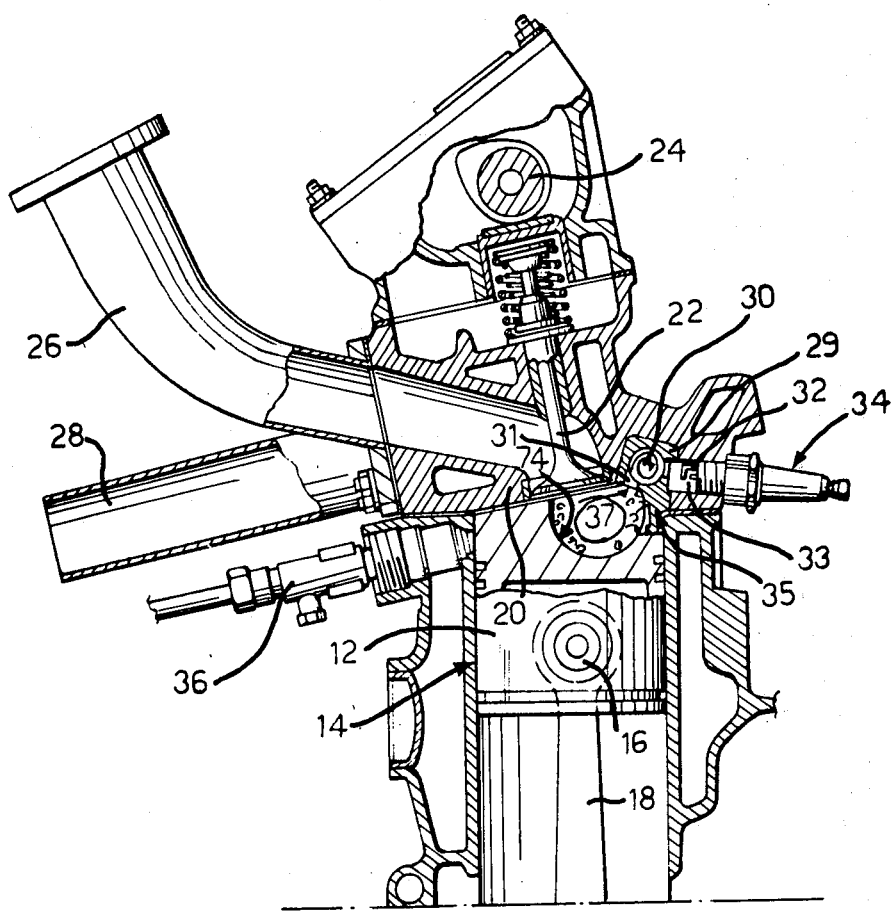
FIG. 11 is a view similar to FIG. 1 during the combustion stroke of the illustrated piston of the engine.
Figure 13:
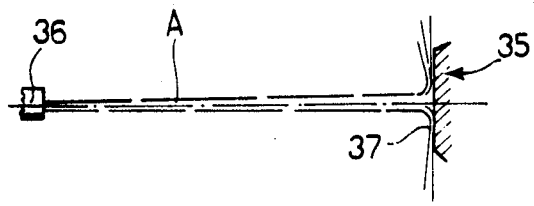
Figure 18:
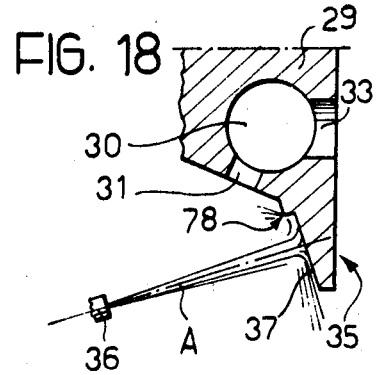
Figure 14:
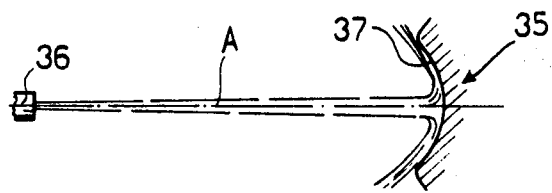
Figure 19:
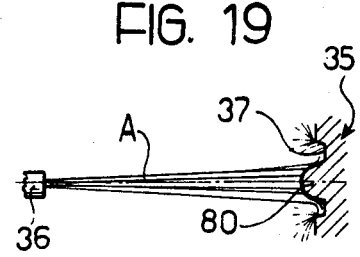
Figure 15:
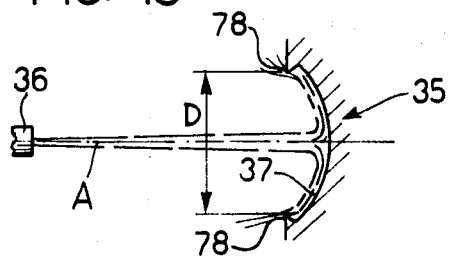
Figure 20:
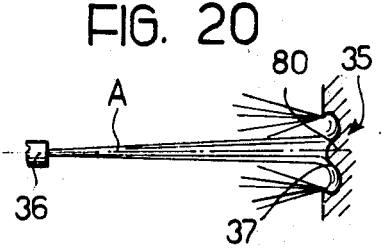
Figure 16:
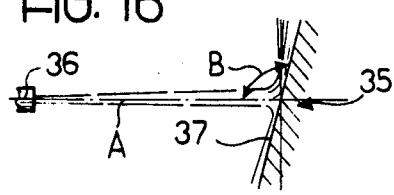

In the variant of FIGS. 9 to 11, the ignition prechamber 30 is recessed in an insert 29 located within the cylinder head 20 in proximity to a part of the upper edge of the cylinder 12. The prechamber 30 communicates at its lower end through a mouth 31 with the interior of the cylinder 12, and laterally with a cavity 33 recessed into the head 20 and into which protrude the electrodes 32 of the sparking plug 34, which is arranged substantially horizontally.

The insert 20 has an integral baffle 35 located below the cavity 33 and projecting in a substantially axial direction into the cylinder 12. The baffle 35 has an impingement surface 37, the function of which will be described later, disposed on the opposite side of the mouth 31 of the prechamber 30 from the axis of the cylinder 12. The impingement surface 37 faces towards a fuel injector 36, which is situated in the side wall of the cylinder 12 in proximity to the head 20, directly opposite to the baffle 35, and is connected to a fuel injection pump (not shown). The fuel injector 36 is preferably of the type with a single atomizer or of the "pintle nozzle" type and is shaped so as to direct a single compact jet of fuel, indicated by A, with substantially zero angle of divergence, and with strong penetration even for modest engine loads, directed substantially orthogonally to the impingement surface 37 of the baffle 35. Where the injector 36 is of the single orifice type, the diameter of its orifice is preferably between 0.2 and 0.3 mm, for engines with a unitary swept volume of about 500 c.c.

As illustrated in detail in FIG. 10, the crown of the piston 14 is roof-shaped and has a surface portion 70, facing towards the fuel injector 36, which has an inclination to the cylinder axis identical to the inclination of the facing surface of the head 20, and a surface portion 72 of smaller surface area than the surface portion 70. A cavity 74 is recessed in the crown of the piston 14 and forms the greater part of the volume of the combustion chamber of the cylinder 12. The cavity 74 has a substantially hemispherical shape and is displaced, relative to the geometrical centre of the crown of the piston 14, towards the prechamber 30. By confining the cavity 74 to a part only of the crown of the piston 14 extensive "squish" areas for the combustible mixture are established between the crown of the piston 14 and the cylinder head 20. The cavity 74 is connected laterally with a radial recess 76 in the piston crown which, in the top dead centre position of the piston 14 accommodates the baffle 35.

Figure 12:
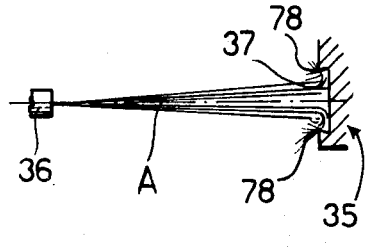
FIG. 12 is a schematic view in partial section on an enlarged scale of a detail of the engine illustrated in FIGS. 9 and 11, and FIGS. 13 to 20 illustrate eight variants of FIG. 12.
Figure 17:
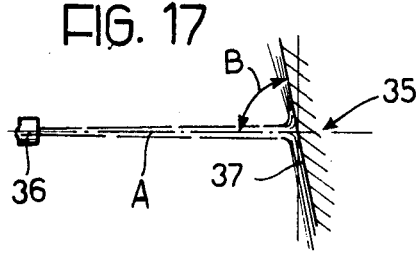

The impingement surface 37 of the baffle 35, illustrated in detail in FIG. 12, is flat and delimited at its upper and lower edges by shoulders 78 which are effective to prevent the entry of fuel directly into the prechamber 30.

In operation, the injection of fuel is carried out during the compression stroke (FIG. 9) by the use of relatively high injection pressures. In this phase, the degree of stratification of the charge can be regulated according to the engine load by varying the timing of the injection. The impingement of the fuel jet A against the surface 37 of the baffle 35 causes fine atomization of the fuel in correspondence with the region of the cylinder 12 in front of the mouth 31 of the prechamber 30. The fuel, entrained by the air during the compression stroke, enters the prechamber 30 in a finely atomized state or in the vapour phase, instead of in the form of a liquid filament. The baffle 35 therefore effectively prevents both the wetting of the surface of the cylinder 12 opposite the injector 36, and the wetting of the electrodes 32 of the sparking plug 34. The previously described position of the mouth 31 of the prechamber 30 relative to the baffle 35 ensures that the atomized mixture entering the prechamber 30 is compelled, before reaching the electrodes 32 of the sparking plug 34, to flow along the wall of said prechamber 30 and thereby to be subjected to an efficient preheating.

During the combustion phase (FIG. 10), ignition of the mixture first occurs in the prechamber 30, where the mixture is relatively rich, and spreads rapidly into the combustion chamber formed by the piston cavity 74, assisted by the formation of a cylindrical vortex flow about a horizontal axis, due to the asymmetric position and to the shape of the cavity 74 and due to the "squish" areas defined between the crown of the piston 14 and the cylinder head. This vortex flow about a horizontal axis drives the hotter, and therefore lighter gases emerging from the prechamber 30 into a centripetal spiral flow path which allows a rapid combustion of the relatively lean mixture and avoids losses of efficiency and the formation of carbon monoxide which originated from the combustion of the rich mixture of the pre-chamber 30.

FIGS. 13 to 20 illustrate some variants of the impingement surface 37 of the baffle 35. The said impingement surface 37 can be flat (FIG. 13) or concave with a spherical or cylindrical surface (FIG. 14), and the shoulders 78 can be omitted. Where the impingement surface 37 is flat or cylindrical, the angle B between the axis of the impinging fuel jet A and said impingement surface 37 facing towards the cylinder head 20 (FIGS. 16 and 17), may be different from 90°, and may for example, be between 60° and 100°. By appropriate selection of this angle it is possible to predetermine the area in which the mixture is formed and in consequence the distribution of the fuel, at the end of the compression phase, between the piston cavity 74 and the ignition prechamber 30.

Where the impingement surface 37 is cylindrical with a horizontal axis and bounded by shoulders 78 (FIG. 15), the width D of the surface is preferably between 10 and 20 mm for engines with a unitary swept volume between 300 and 500 c.c.

The impingement surface 37 may have a single raised shoulder or ridge 78 located between the surface 37 and the mouth 31 of the ignition prechamber 30 (FIG. 18) for the purpose of preventing the direct ingress of the fuel jet A into the prechamber 30. In this case, the impingement surface 37 may be inclined to the axis of the cylinder 12 so as to lie at a distance from the axis of the cylinder 12 which increases progressively from the edge of the surface 37 adjoining the prechamber 30. The shoulder 78 can also be formed by an annular projection with circular cross-sectional profile with its centre substantially coinciding with the axis of the fuel jet A.

The impingement surface 37 can alternatively have a superficial conformation such as to facilitate the atomization of the fuel, both when the surface is flat (FIG. 19) and when it is cylindrical. In this case, the impact surface 37 can be roughened or formed with protuberances. For example, in FIG. 20, the surface 37 has a central projection 80 directed towards the impinging fuel jet A.

We claim:

1. An internal combustion engine of the type having a cylinder block, a number of cylinders therein, a cylinder head, fuel injectors for injecting fuel into each cylinder, a piston in each cylinder having a combustion chamber defined largely by a cavity recessed in the crown of the piston and spark ignition means having electrodes in communication with said combustion chamber; the improvements comprising:

the fuel injector for each cylinder is situated in a side wall of the cylinder in proximity to the cylinder head;

the cavity recessed into the piston is concentrated in one part of the crown of the piston so as to form squish areas for the combustible mixture between the crown of the piston and the cylinder head;

an insert containing an ignition pre-chamber, with which the electrodes of the spark ignition means communicate, is located in the side of the cylinder head opposite the fuel injector, said pre-chamber having in its lower part a mouth communicating with the interior of the cylinder;

the insert within which the pre-chamber is recessed has a baffle which projects substantially in the direction of the cylinder axis into the cylinder and which is superimposed in the top dead centre position of the piston on a part of the piston cavity, said baffle having an impingement surface facing towards the fuel injector; the mouth of the ignition pre-chamber being located adjacent the baffle but displaced towards the axis of the cylinder with respect to the impingement surface of said baffle; and the fuel injector having means to direct a single fuel jet of narrow divergence onto said impingement surface while being arranged with the axis thereof substantially perpendicular to said impingement surface so that the impact of the jet against said impingement surface causes fine atomization of the fuel in the region of the cylinder in front of the mouth of the ignition pre-chamber.

2. An engine as in claim 1, wherein said impingement surface is flat.

3. An engine as in claim 1, wherein said impingement surface is concave.

4. An engine as in claim 3, wherein said impingement surface is substantially spherical.

5. An engine as in claim 3, wherein said impingement surface is substantially cylindrical.

6. An engine as in claim 1, wherein the angle between the axis of the fuel jet and said impingement surface facing towards the head of the cylinder is between 60° and 100°.

7. An engine as in claim 1, wherein the impingement surface is inclined to the axis of the cylinder so that it is spaced from the axis of the cylinder by a distance which increases progressively starting from the edge adjacent the ignition prechamber.

8. An engine as in claim 1, wherein the impingement surface has a surface conformation which facilitates the atomization of the fuel.

9. An engine as in claim 1, wherein the impingement surface has, at least in correspondence with its portion adjacent the mouth of the ignition prechamber, a shoulder which prevents the direct ingress into the ignition prechamber of said fuel jet.

10. An engine as in claim 1, wherein the axis of the fuel injector and the geometrical centre of the prechamber lie substantially in a common plane about which the piston cavity is symmetrical, said plane being a diametral plane of the cylinder which is orthogonal to the axis of the engine crankshaft.

11. An engine as in claim 1, wherein the cavity recessed into the piston crown has an elongate shape along the fuel jet axis of the injector.

12. An engine as in claim 1, wherein the fuel injector is of the single orifice type.

13. An engine as in claim 1, wherein the fuel injector is of the "pintle nozzle" type.

* * * * *